US009098532B2

(12) United States Patent
Cragun et al.

(10) Patent No.: US 9,098,532 B2
(45) Date of Patent: Aug. 4, 2015

(54) GENERATING ALTERNATIVE DESCRIPTIONS FOR IMAGES

(71) Applicant: International Business Machines Corporation, Armonk, NY (US)

(72) Inventors: Brian J. Cragun, Rochester, MN (US); Marc K. Johlic, Seminole, FL (US); Susann M. Keohane, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 13/688,358

(22) Filed: Nov. 29, 2012

(65) Prior Publication Data

US 2014/0146053 A1 May 29, 2014

(51) Int. Cl.
*G06K 9/60* (2006.01)
*G06F 17/30* (2006.01)
*G06K 9/00* (2006.01)
*G09B 21/00* (2006.01)

(52) U.S. Cl.
CPC .... *G06F 17/30268* (2013.01); *G06F 17/30247* (2013.01); *G06K 9/00* (2013.01); *G09B 21/00* (2013.01)

(58) Field of Classification Search
None
See application file for complete search history.

(56) References Cited

U.S. PATENT DOCUMENTS

| 5,892,843 | A | 4/1999 | Zhou et al. |
| 6,711,291 | B1 | 3/2004 | Stubler et al. |
| 7,028,253 | B1 | 4/2006 | Lieberman et al. |
| 7,394,947 | B2 | 7/2008 | Li et al. |
| 7,457,467 | B2 | 11/2008 | Dance et al. |
| 7,474,759 | B2 | 1/2009 | Sternberg et al. |
| 7,809,192 | B2 | 10/2010 | Gokturk et al. |
| 7,877,384 | B2 | 1/2011 | Yu et al. |
| 7,912,289 | B2 | 3/2011 | Kansal et al. |
| 2006/0242139 | A1 | 10/2006 | Butterfield et al. |
| 2008/0013940 | A1 | 1/2008 | Jung et al. |
| 2009/0063455 | A1 | 3/2009 | Li et al. |
| 2009/0241058 | A1 | 9/2009 | Costello et al. |
| 2010/0063961 | A1 | 3/2010 | Guiheneuf et al. |
| 2010/0192055 | A1* | 7/2010 | Shaked et al. ................. 715/234 |
| 2011/0182493 | A1 | 7/2011 | Huber et al. |
| 2011/0258216 | A1* | 10/2011 | Supakkul et al. ............. 707/769 |

(Continued)

OTHER PUBLICATIONS

Automatic Image Annotation—Documents, Zhou et al., ACM 978-1-4503-0166-4,2010, pp. 7-12.*

(Continued)

*Primary Examiner* — Jayesh A Patel
(74) *Attorney, Agent, or Firm* — Francis Lammes; Stephen J. Walder, Jr.; William J. Stock

(57) ABSTRACT

Mechanisms are provided for generating alternative text descriptions for images in electronic documents. An original image embedded in an electronic document is analyzed to generate a data pattern for the image. A matching operation is performed to identify similar images in other electronic documents from sources of electronic documents based on the generated data pattern. Textual description information associated with the similar images is extracted from data associated with the similar image. An alternative text description for the original image is generated based on the extracted textual description information associated with the similar images. The alternative text description for the original image is stored in association with the original image.

20 Claims, 3 Drawing Sheets

(56) References Cited

U.S. PATENT DOCUMENTS

2011/0317885 A1 12/2011 Leung et al.
2012/0106854 A1 5/2012 Tang et al.

OTHER PUBLICATIONS

Demir, Seniz et al., "Summarizing Information Graphics Textually", Computational Linguistics—COLI, vol. 38, No. 3, pp. 527-574, 2012.

Deschacht, Koen et al., "Text Analysis for Automatic Image Annotation", Proceedings of the 45th Annual Meeting of the Association of Computational Linguistics, Jun. 2007, pp. 1000-1007.

Sasaki, Hideyasu et al., "A Prototype Implementation of Metadata Generation for Image Retrieval", Proceedings of the 2004 International Symposium on Applications and the Internet Workshops (SAINTW'04), IEEE, Jan. 2004, pp. 1-7.

Zhou, Ning et al., "Automatic Image Annotation by Using Relevant Keywords Extracted from Auxiliary Text Documents", VLS-MCMR'10, Oct. 29, 2010, pp. 7-12.

* cited by examiner

GENERATING ALTERNATIVE DESCRIPTIONS FOR IMAGES

BACKGROUND

The present application relates generally to an improved data processing apparatus and method and more specifically to mechanisms for generating alternative descriptions for images.

The Internet and web-based content are a backbone of today's social, commercial, and governmental organizations. As such, the majority of content on the Internet is output to users of client devices via a visual manner, i.e. readable text, viewable images, and the like. While audio information is also provided via the Internet, a vast majority of the information is presented in a visual manner.

Due to the visual nature of this content, it can be inaccessible to visually impaired persons. While text readers are available to audibly output the text of a web page or document, images on a web page or in a document may have no meaning to a visually impaired person if there is no textual description of the image that can be converted to audio output. Thus, large portions of web pages and documents may be inaccessible to visually impaired persons leading to a loss of information to these persons.

SUMMARY

In one illustrative embodiment, a method, in a data processing system, is provided for generating alternative text descriptions for images in electronic documents. The method comprises analyzing an original image embedded in an electronic document to generate a data pattern for the image. The method further comprises performing a matching operation to identify one or more similar images in other electronic documents from one or more sources of electronic documents based on the generated data pattern. The method also comprises extracting textual description information associated with the one or more similar images from data associated with the one or more similar image. Moreover, the method comprises generating an alternative text description for the original image based on the extracted textual description information associated with the one or more similar images and storing the alternative text description for the original image in association with the original image.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
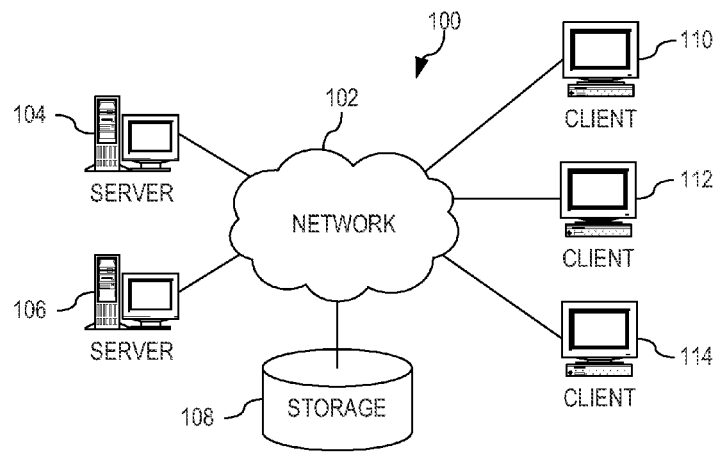
FIG. 1 is an example diagram of a distributed data processing system in which aspects of the illustrative embodiments may be implemented.

The illustrative embodiments provide mechanisms for providing alternative text descriptions of images on web pages and electronic documents. As mentioned above, because of the visual nature of content of web pages and electronic documents, such content is generally inaccessible to visually impaired persons without being able to convert such content to other forms, such as audible or tactile output. Thus, in order to make such content accessible to visually impaired persons, it is important to provide textual descriptions that can be converted to audio or tactile representations that can be output to visually impaired persons. This is especially true for images on web pages or in electronic documents which may otherwise have no meaning to a visually impaired person. Such textual descriptions are also useful for other purposes including searching, classification, and the like.

In providing textual descriptions of images on web sites and in electronic documents, it should also be considered that images may be categorized generally as decorative, i.e. non-informative, and non-decorative, i.e. informative images. Thus, providing textual representations of decorative images for purposes of making them accessible to visually impaired persons, for searching and/or classification, or the like, may in fact distort or misrepresent the content of the web page or electronic document. Informative images are meaningful to users and so should have a textual representation of the image that can be output to a user. By contrast, decorative images, such as spacers, bullets, borders, etc. are merely "eye-candy" and convey no semantic meaning for the other content of the web page or electronic document.

The illustrative embodiments provide mechanisms for automatically generating textual description of images on web pages and in electronic documents, taking into account the nature of the image as being either informative or non-informative, i.e. non-decorative or decorative. This automatic generation of textual descriptions of images may be performed for images that do not already have a textual description associated with them or may be used to replace an existing textual description with another automatically generated textual description. The automatically generated text is referred to herein as an "alternative text" representation for the image.

With the mechanisms of the illustrative embodiments, alternative text is generated for informative images on a web page or in an electronic document and a confidence level is generated for the alternative text. This confidence level comprises both a confidence of the accuracy of the automatically generated alternative text and an importance level for indicating an importance of the image relative to the other content of the web page or electronic document. If there is a probability that the image should not have associated alternative text, i.e. a probability that the image is non-informative, a value indicative of this probability may also be generated and associated with the image. These confidence values, along with the automatically generated alternative text, are made available to the users and automated tools/programs.

The mechanisms of the illustrative embodiments allow alternative text to be generated automatically for a large number of images that do not have textual representations of the images. This alternative text may then be used to present the images to visually impaired persons, automated tools, or the like. Along with the alternative text, the confidence values may be provided as well and may be presented along with the alternative text to visually impaired persons so that they may determine what level of credence to give to the image in relation to the other content of the web page or electronic document. With regard to automated tools, such as search engines, classification engines, or highly advanced logic systems such as Watson, available from International Business Machines Corporation of Armonk, N.Y., the alternative text may be processed and given appropriate weights and consideration according the various confidence values associated with the alternative text.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
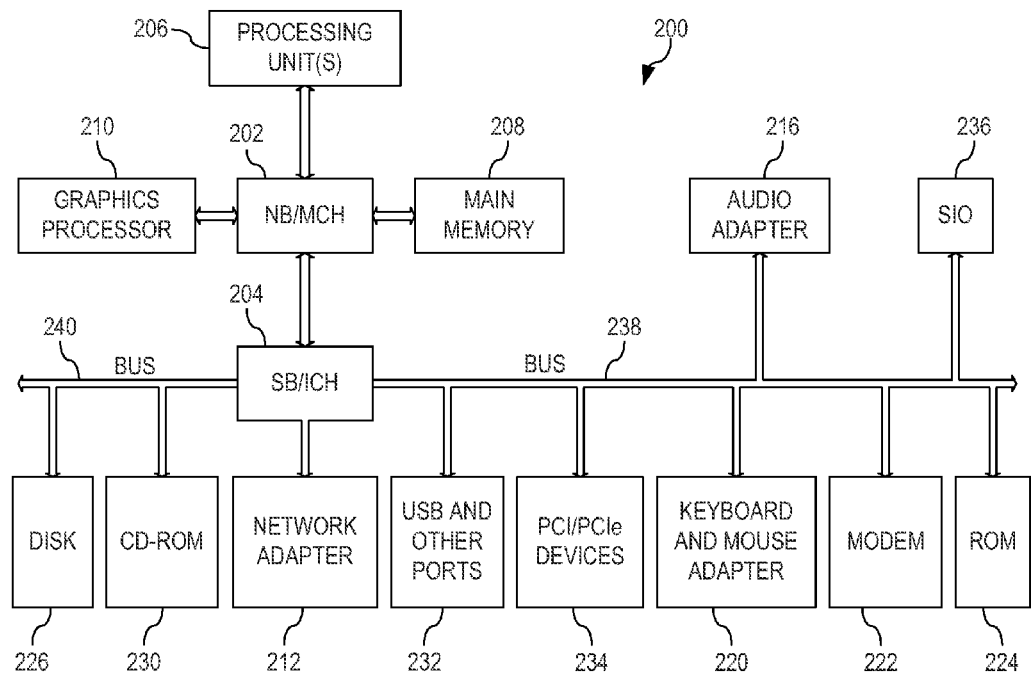
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Referring again to FIG. 1, one or more of the computing devices connected to the network 102 may be a source of web site or electronic document content. For example, one or more of the servers 104, 106 may be a web server that provides web pages having various visual content, including images, to the client devices 110-114 via a web browser application executing on the client devices 110-114, as is generally known in the art. Alternatively, one or more of the servers 104, 106 may be file server, have links to electronic documents, or otherwise store electronic documents for accessing by client devices 110-114, automated tools, or the like. The client devices 110-114 themselves may likewise provide content, such as in the form of electronic documents, which may include images, text, and the like.

In accordance with the illustrative embodiments, one or more of the servers 104, 106, or even client devices 110-114, may include an alternative text generation engine that implements the functionality of the illustrative embodiments with regard to generating alternative text for images embedded in electronic content, such as web pages and electronic documents. The alternative text generation engine may be initiated to generate alternative text for images in a web page or electronic document in response to receiving the web page or electronic document, for example. That is, once web page content is created and is being prepared to be deployed for download by client computing devices, the web page content may be processed by the alternative text generation engine in accordance with the illustrative embodiments described herein. Alternatively, if a user of a client device uploads a document to a server, the electronic document may be processed by the alternative text generation engine in response to receiving the uploaded document. The alternative text generation engine may be initiated in response to the web page or electronic document being transferred to another computing device, e.g., as part of a download of the web page, or file transfer of the electronic document, to a client computing device. Many other scenarios in which web page content and electronic documents are generated/transferred may also give rise to the initialization of the alternative text generation engine of the illustrative embodiments without departing from the spirit and scope of the illustrative embodiments.

In general, when initialized, the alternative text generation engine scans an electronic document or web page for all images embedded in the electronic document or web page. For each of the images found, the alternative text generation engine determines if the image has an associated text description in the electronic document/web page. If there is already associated text descriptions, this information may be used to generate alternative text descriptions as discussed hereafter, which may replace the existing text descriptions or otherwise supplement the existing text descriptions.

The alternative text generation engine automatically generates an alternative text description for each of the found images. The automatic generation of this alternative text description may make use of various technologies and sources of information regarding the found images to generate this alternative text description. For example, the alternative text generation engine may use image mapping technologies to search for images in public and private sources that are similar or closely match the found images in the electronic document/web page. From this information, a determination can be made as to how often the image or similar images, have been used in other electronic documents/web pages. Text descriptions for these other instances of the image, or similar images, may be gathered along with information regarding the other source locations of the image or similar images found, e.g., media outlet, blog, university and/or company web site, etc. The context of the usage of the image or similar images may be surmised from the surrounding text at the location that the image or similar images were found in the search of other sources. Furthermore, user input, such as comments, associated with the image or similar images in these other sources may be gathered. Each of these sources of information are evaluated and analyzed to generate an alternative text description for the image in the original electronic document/web page.

Each image may be categorized into one or more of a plurality of predefined categories, e.g., portrait, humorous, data driven, etc.) or categorized as "other", i.e. a default categorization. A confidence rating may be generated for the automatically generated alternative text description. This confidence rating may be generated based on a comparison to the existing text description, if any. The confidence rating may further be generating based on the types and the relative amount of information gathered about the image or similar images during the process described above when automatically generating the alternative text description.

A relevance rating may also be automatically generated for the alternative text description. The relevance rating is a value indicative of the relevance of the image to the other content of the electronic document/web page in which the image is present. Thus, the relevance rating provides a measure of the informative or non-informative nature of the image, i.e. a measure indicative of whether the image is simply decorative or provides additional information for understanding the content of the electronic document/web page.

All of this information, i.e. the alternative text description, category, confidence rating, and relevance rating may be associated with the image in the electronic document/web page for use by other automated tools/programs. For example, this information may be used when presenting the content of the electronic document/web page to a user via a web browser of the client device. As another example, this information may be provided along with the web page/electronic document content to automated tools to perform their various functions based on the relevance rating, confidence level, etc. These automated tools may perform various functions including searching the content, classifying the content, presenting the content, or the like. In one illustrative embodiment, this information may be output to a user via a client device in an audible format so that a visually impaired person may not only receive the content and the alternative text description, but an indication of the confidence associated with the alternative text description and the relevance of the image to the other content in the electronic document/web page.

Figure 3:
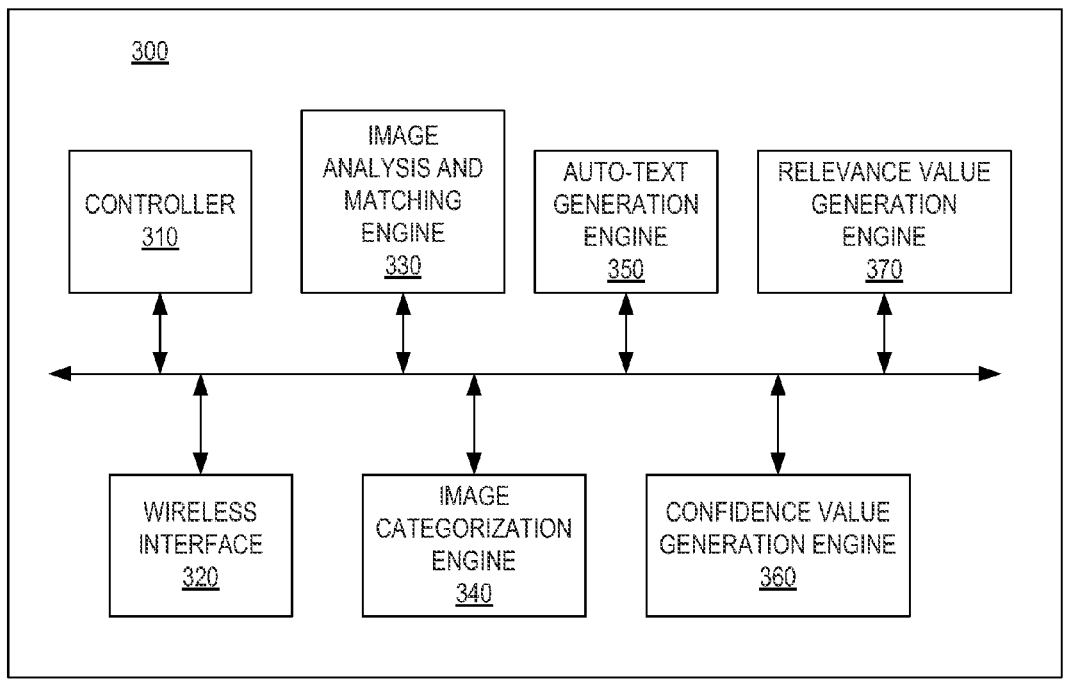
FIG. 3 is an example block diagram of the primary operational elements of an alternative text generation engine in accordance with one illustrative embodiment.

FIG. 3 is an example block diagram of the primary operational elements of an alternative text generation engine in accordance with one illustrative embodiment. The elements shown in FIG. 3 may be implemented as hardware, software, or any combination of hardware and software. For example, in one illustrative embodiment, the elements of FIG. 3 are implemented as software instructions loaded into one or more memories and executed on one or more processors of one or more data processing systems. In other illustrative embodiments, all or selected ones of the elements shown in FIG. 3 may be implemented as hardware logic implemented in one or more hardware devices of one or more data processing systems.

As shown in FIG. 3, the alternative text generation engine comprises a controller 310, a network interface 320, an image analysis and matching engine 330, an image categorization engine 340, an auto-text engine 350, a confidence value generation engine 360, a relevance value generation engine 370. The controller 310 controls the overall operation of the alternative text generation engine and orchestrates the operation of the other elements. The network interface 320 provides a communication pathway through which data may be sent and received. In one illustrative embodiment, the image that is the basis upon which the alternative text generation engine operates, which may be embedded in a web page or electronic document for example, may be retrieved from another computing device or network storage system via the network interface 320. In other illustrative embodiments, the image may be retrieved from a local storage (not shown) without the need to communicate via the network interface to obtain the image information.

The image analysis and matching engine 330 is primarily responsible for analyzing the image retrieved from the web page or electronic document to generate a pattern for the image and then searching for the same or similar images from other sources. The image analysis and matching engine 330 takes the pattern for the image and performs pattern matching or image mapping on other sources of images in at least one of public or private locations. Examples of a private locations include records of previously identified images processed by the engine, as well as private stock stores of images licensed by the user for use in presentations. Public places may be searched by using one of the many reverse image search engines, such as tineye.com, for example, to find existing images on the web. For example, other web pages available from other web servers, electronic documents from other file servers or networked storage systems, or the like, may be searched to identify those having images that are the same or similar to the image retrieved for the web page/electronic document of interest. In order to reduce the size of the set of web pages/electronic documents searched, various mechanisms may be utilized to limit the collection of web pages/ electronic documents. In one illustrative embodiment, only selected sources, in a white list or the like, are searched or the search is limited to a specified sub-net or set of sub-nets of the network.

In other illustrative embodiments, a keyword search is performed using a search engine to retrieve the web pages and/or electronic documents that are most likely to be similar to the web page/electronic document of interest, from which the image was retrieved. The keywords used for such a search may be extracted from the web page/electronic document of interest, or metadata associated with the web page/electronic document of interest, in a manner generally known in the art. The result is a set of web pages/electronic documents that are most likely directed to a same subject matter as the original web page/electronic document of interest and which are most likely to have images matching or similar to that of the image being analyzed by the image analysis and matching engine 330.

The images in the web pages/electronic documents found during the search are compared to the pattern of the image retrieved from the web page/electronic document of interest. For those other images found in the search that match the original image from the web page/electronic document of interest, the degree of matching may be used as a basis for ranking the matching images. Moreover, the tags, textual descriptions of the matching/similar images, descriptive data, and the like associated with the matching/similar images are retrieved. If no textual descriptions, descriptive data, or tags are associated with an image, a description of the image may be generated from surrounding text of the electronic document/web page, tags of the electronic document/web page as a whole, or the like, e.g., the tags associated with the document/web page may be used as tags for the matching/similar image, or text within a predetermined number of lines or spacing on the web page may be used as the textual description for the matching/similar image.

The tags may be used to compare to other images found as part of the search to determine a number of times images having the same tag are used by the various sources. Moreover, weightings may be associated with the sources based on characteristics of the sources. For example, a first weight may be given to sources within the same sub-net as the source of the web page/electronic document of interest, a second weight may be given to sources in a different sub-net, a third weight may be given to sources that are web servers, a fourth weight may be given to sources that are file servers, and still further other weights may be assigned based on the types of content provided by the source. All of this information may be used to generate a score value for each of the matching or similar images. These scores can be used to rank the various matching/similar images relative to one another and may be used later to select alternative text components from the textual descriptions, descriptive data, tags, and the like, of the various matching or similar images based on such rankings.

The image categorization engine 340 may categorize the matching/similar images into various categories based on characteristics of the image as determined from the retrieved textual descriptions, descriptive data, tags, etc. The categories into which the matching/similar images are categorized may be predetermined, e.g., humorous, portrait, data driven (e.g., graphs, charts, etc.), decorative pattern, etc. The original image extracted from the web page/electronic document of interest may similarly be categorized by the image categorization engine 340 so that a comparison of the categories of the original image and the matching/similar images may be used to determine the most relevant matching/similar images for purposes of collecting alternative text description components for the original image. Such categorization, however, is not necessary and, in some illustrative embodiments, may be eliminated from the implementation.

The auto-text engine 350 takes all of the information generated by the image analysis and matching engine 330 and the image categorization engine 340, and selects components from the textual descriptions, descriptive data, tags, etc. associated with the matching/similar images for inclusion in the alternative text description for the original image. For example, for each of the matching/similar images, a listing of keywords may be generated based on the textual descriptions, descriptive data, tags, and the like, associated with the matching/similar images. These keywords may be extracted directly from the textual descriptions, descriptive data, tags, and the like with some filtering being done to remove non-descriptive text, e.g., the words "a", "the", and the like.

The listing of keywords of the matching/similar images may be compared to one another to generate a resulting listing of keywords based on the keywords in the various lists that match. This may be done across all matching/similar images, or only with regard to those matching/similar images having a predetermined score or higher, i.e. a predetermined threshold degree of matching or higher. For example, only matching/similar images in the category corresponding to the category of the original image may be considered and have their listing of keywords compared. Alternatively, a higher weight may be given to matching/similar images in the same category as the original image than those matching/similar images in the other categories.

In one illustrative embodiment, the scores of the various matching/similar images may be used to weight the keywords extracted from the corresponding list of keywords when generating the resulting listing of keywords. That is, for each keyword in each list of keywords of matching/similar images, a weight may be calculated as the sum of the weights of the various matching similar images whose listing of keywords contains that keyword. These weights may be stored in association with the keyword in the resulting listing of keywords. The resulting listing of keywords may then be pruned by eliminating keywords having a score that is less than a predetermined threshold weight value. Thus, keywords from more heavily weighted sources may be given greater priority than keywords from other relatively lower weighted sources. Moreover, keywords that have a higher frequency of use across the various sources will have a relatively higher weight than keywords that have a relatively smaller frequency of use across the various sources. Then, only those keywords that meet the threshold requirements will be kept in the resulting listing of keywords.

It should be appreciated that above examples of mechanisms for generating the alternative text description from the text descriptions, description data, tags, and the like, of the matching/similar images are presented as examples only and the illustrative embodiments should not be construed to be limited to such. Rather, other methodologies may be used to automatically generate alternative text descriptions from the text descriptions, description data, tags, and the like of matching/similar images without departing from the spirit and scope of the illustrative embodiments.

The resulting listing of keywords extracted from the textual descriptions, descriptive data, tags, and the like, associated with the matching/similar images is used to define an alternative textual description for the original image. This alternative textual description is associated with the original image in the web page/electronic document of interest and may be used as a basis for performing other operations by other programs and/or automated tools. For example, these other programs and/or automated tools may perform various classification, search, or presentation operations for classifying the web page/electronic document based on the alternative text description of the original image, determining if the web page/electronic document meets search criteria based on the alternative text description of the original image, or present the web page/electronic document to users via their web browser or other software on their client computing device based on the alternative text description of the original image. With regard to the presentation of the web page/electronic document, the web page/electronic document may be presented in an audible format with the alternative text description for the image being presented audibly as well.

To assist in the operations performed on the alternative text description, the alternative text generation engine 300 may further generate confidence values and relevance values for the alternative text descriptions generated from the listing of keywords of the matching/similar images. These confidence values and relevance values may likewise be stored in association with the original image and may be used by the programs/automated tools when operating on the web page/electronic document in which the original image is embedded. For example, the confidence value and/or relevance value may be audibly output along with the image's alternative text description so that a visually impaired person is informed of the confidence that the alternative text description is accurate and the relevance of the alternative text description to the other portions of the web page/electronic document for understanding the content of the web page/electronic document.

The confidence value generation engine 360 is responsible for generating the confidence value to be associated with the alternative text description of the original image. The confidence value may be calculated in many different ways depending upon the particular implementation selected. For example, in one illustrative embodiment, the confidence value may be calculated as an average of the scores of the various keywords included in the alternative text description. In another illustrative embodiment, the confident value may be calculated using a Bayesian algorithm to apply a normal distribution over the scores of the various keywords in the alternative text description. For example, the confidence value may be calculated using the following equation:

$$\text{Confidence Rating } (CR) = (v/(v+m))*R + (m/(v+m))*C$$

where R is the average score for the keywords in the alternative text description, v is the number of keywords in the alternative text description, m is a minimum number of keywords in the alternative text description required, and C is the mean across all confidence ratings (e.g., if the confidence rating is based on a 5 star rating range, the mean C could be set equal to 3).

The confidence rating may further be based on a comparison of the alternative text description with an original text description associated with the original image, if there is one. A degree of matching between the alternative text description and the original text description may be determined and may be used to calculate a confidence rating, e.g., a higher degree of matching gives a higher confidence rating. Other types of confidence value calculations may be used without departing from the spirit and scope of the illustrative embodiments.

The relevance value generation engine 370 is responsible for generating the relevance value to be associated with the alternative text description of the original image. The relevance rating may be calculated in many different ways depending upon the particular implementation selected. For example, the relevance value generation engine 370 may determine a degree of matching of the alternative text description to the other content of the web page/electronic document. This may involve performing a keyword or text comparison of the alternative text description to the text surrounding or in close proximity to the original image within the web page/electronic document. For example, keywords and phrases may be extracted from the web page/electronic document in a portion of the web page/electronic document within a predetermined range of the original image, or in the web page/electronic document as a whole. These extracted keywords and phrases may be compared against the alternative text description to determine a degree of matching. The degree of matching may be based on the frequency of occurrence of a match between the alternative text description and keywords extracted from the web page/electronic document. Moreover, the degree of matching may be further determined based on a relative amount of matching, e.g., entire phrases, individual words, relative distance between matching keywords in the text of the web page/electronic document (measured in numbers of words), or the like. This information may be used to generate a degree of matching where keywords in the alternative text description that match entire phrases in the text of the web page/electronic document, that have a relative higher frequency of occurrence in the text of the web page/electronic document, and the like, have a higher relevance rating value than other keywords in the alternative text description of the original image.

An example illustrating the identification of a relevance of the alternative text representation may be an article discussing a new XYZ company logo. The automatically generated alternative text description for an original image in the article may be "new XYZ logo." A higher relevancy rating value is given to this text description when it appears as an exact phrase match in the content of the article (e.g., " . . . new XYZ logo . . . "). A higher frequency of occurrence of the phrase increases the relevance rating value.

Another example may be an article discussing sales figures of Apple and Android phones for one quarter of the past fiscal year. Three images may be contained in this article: an image of Steve Jobs, the Apple logo, and a chart showing Apple stock performance for the past fiscal year. The automatically generated alternative text descriptions for these images may be as follows:

| Image | Alternative Text Description |
| --- | --- |
| Image of Steve Jobs | Steve Jobs |
| Image of Apple Logo | Apple Logo |
| Image of Bar Graph Showing YTD Sales Figures | Graph showing increase in sales of Apple phones 4Q11 |

In this example, assume that the phrase "Steve Jobs" is mentioned once in the article. The word "Apple" is mentioned several times, but there is no exact match of "Apple logo" in the article. The phrase "increase in sales of Apple phones" is mentioned five times in the article. As a result, the bar graph image is given a highest relevance rating, the image of Steve Jobs is given a second highest relevance rating, and the Apple logo is given a third, or even "irrelevant," relevance rating.

Thus, the illustrative embodiments provide a mechanism for automatically generating alternative text descriptions for embedded images in a web page or other type of electronic document that is subject to the operations of the illustrative embodiments. This automatic generation of alternative text descriptions may be based on the identification of the same or similar images being used in other sources of web pages/ electronic documents and their associated textual descriptions, descriptive data, tags, and the like. Moreover, a confidence rating and relevance rating for the automatically generated alternative text may be generated and associated with the automatically generated alternative text. All of this information may be associated with the image in the web page/electronic document, such as via metadata stored within the web page/electronic document or as a separate file associated with the web page/electronic document. As a result, subsequent processing of the web page/electronic document may take into consideration this alternative text description, the confidence rating, and relevance rating when performing the processing. In the case of presenting the web page/electronic document to visually impaired persons, the alternative text description may be audibly output along with the other content of the web page/electronic document. In addition, the confidence rating and relevance rating may likewise be audibly output to assist the visually impaired in determining an amount of credence to give to the image in the understanding of the other content of the web page/electronic document.

Figure 4:
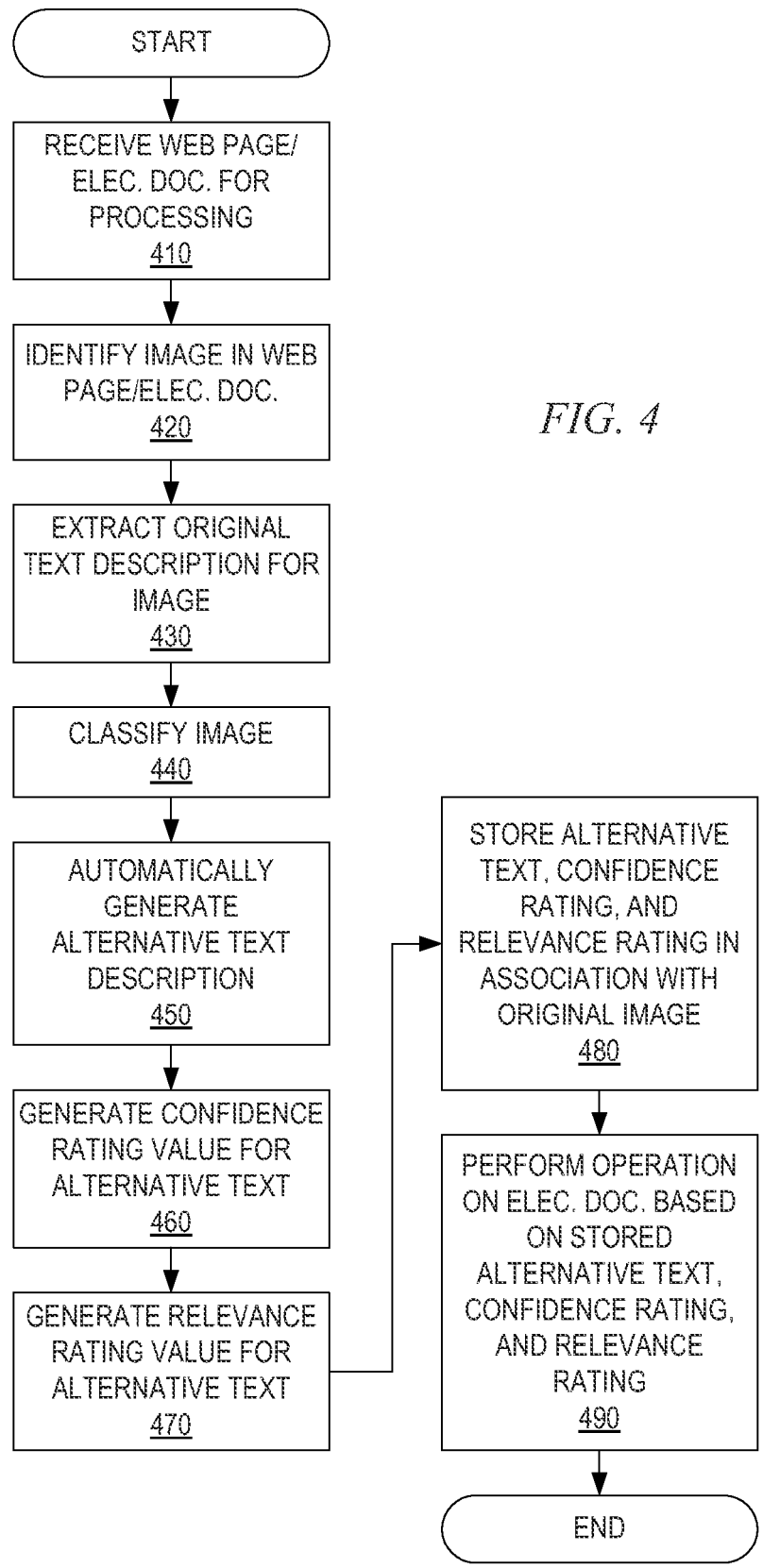
FIG. 4 is a flowchart outlining an example operation for generating an alternative text description for an image in accordance with one illustrative embodiment.

FIG. 4 is a flowchart outlining an example operation for generating an alternative text description for an image in accordance with one illustrative embodiment. The operation outlined in FIG. 4 may be implemented by an alternative text generation engine, such as shown in FIG. 3, for example. As shown in FIG. 4, the operation starts with the receipt of a web page or electronic document for processing (step 410). An image in the web page/electronic document is identified (step 420). Any original text description for the image in the web page/electronic document may be extracted (step 430) and the original image may be classified into one or more predefined classifications (step 440). An alternative text description for the identified image is automatically generated using the mechanisms described previously (step 450). As noted above, this process may involve determining degrees of matching, weightings for various textual descriptions from matching/similar images, categorization of the matching/ similar images, etc.

A confidence rating value is calculated for the alternative text description that is generated (step 460). A relevance rating value is calculated for the alternative text description (step 470). The alternative text description, confidence rating, and relevance rating are stored in association with the original image (step 480). The process of steps 420-480 may be repeated for each subsequent image found in the web page/ electronic document.

Thereafter, other processing of the web page/electronic document may be performed using the alternative text description, confidence rating, and relevance rating (step 490). This other processing may include classification, search operations, or presentation operations being performed on the web page/electronic document. The operation then terminates. It should be appreciated that step 490 may in fact not be part of the processor may be performed at a remote time from the other steps of the operation outlined in FIG. 4. That is, the operation of FIG. 4 may be performed as part of a process for performing the operation at step 490 as illustrated, or steps 410-480 may be performed at a separate time from step 490, and as a precursor to step 490.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising at least one processor and at least one memory, for generating alternative text descriptions for images in electronic documents, comprising:
   analyzing, by the data processing system, an original image embedded in an electronic document to generate a data pattern for the image;
   performing, by the data processing system, a matching operation to identify one or more similar images in other electronic documents from one or more sources of electronic documents based on the generated data pattern;
   extracting, by the data processing system, textual description information associated with the one or more similar images from data associated with the one or more similar images;
   generating, by the data processing system, an alternative text description for the original image based on the extracted textual description information associated with the one or more similar images;
   storing, by the data processing system, the alternative text description for the original image in association with the original image;
   generating a confidence level value for the alternative text description, wherein the confidence level value identifies a level of confidence that the alternative text description accurately describes content of the original image; and
   storing the confidence level value in association with the alternative text description, wherein the confidence level value is generated based on scoring each keyword in the alternative text description according to a frequency of occurrence of the keyword in textual description information associated with the one or more similar images and wherein the confidence level value is generated using the following relationship:

$$\text{Confidence level value} = (v/(v+m))*R + (m/(v+m))*C$$

where R is an average score for the keywords in the alternative text description, v is a number of keywords in the alternative text description, m is a minimum number of keywords in the alternative text description required, and C is a mean confidence level value.

2. The method of claim 1, wherein analyzing the original image further comprises classifying the image as either informative or non-informative, wherein, in response to the image being classified as non-informative, the method is aborted before executing the performing, extracting, generating, and storing operations.

3. The method of claim 1, wherein the confidence level value is generated based on a comparison of the alternative text description to an existing text description associated with the original image.

4. The method of claim 1, further comprising:
   generating a relevance rating value for the alternative text description, wherein the relevance rating value identifies a level of relevance of the alternative text description to a remaining portion of the electronic document other than the original image; and
   storing the relevance rating value in association with the alternative text description.

5. The method of claim 4, wherein the relevance rating value is generated at least by:
   comparing at least one of keywords or phrases in the alternative text description to portions of the electronic document;
   determining a degree of matching between the keywords or phrases and text in the portions of the electronic document; and
   generating the relevance rating value based on the degree of matching, wherein the degree of matching is based on a frequency of occurrence of a matching keyword or phrase in the text of the portions of the electronic document.

6. The method of claim 1, wherein generating the alternative text description for the original image based on the extracted textual description information associated with the one or more similar images comprises, for each similar image in the one or more similar images, collecting information regarding at least one of:
   a type of source of the similar image;
   a textual context in which the similar image is presented in the other documents;
   user comments associated with the similar image; or
   a frequency of use of the similar image in the other electronic documents, and wherein generating the alternative text description comprises selecting textual description information associated with the one or more similar images based on a weighting of the textual description information of each similar image relative to textual description information of other similar images in the one or more similar images of the collected information, wherein the weighting is based on the collected information.

7. The method of claim 1, further comprising:
   generating one of an audible or a tactile output of the alternative text description to assist a visually impaired person in obtaining information about the original image.

8. A computer program product, for generating alternative text descriptions for images in electronic documents, comprising a non-transitory computer readable storage medium having a computer readable program stored therein, wherein the computer readable program, when executed on a computing device, causes the computing device to:
   analyze an original image embedded in an electronic document to generate a data pattern for the image;
   perform a matching operation to identify one or more similar images in other electronic documents from one or more sources of electronic documents based on the generated data pattern;
   extract textual description information associated with the one or more similar images from data associated with the one or more similar images;

generate an alternative text description for the original image based on the extracted textual description information associated with the one or more similar images;
store the alternative text description for the original image in association with the original image;
generate a confidence level value for the alternative text description, wherein the confidence level value identifies a level of confidence that the alternative text description accurately describes content of the original image; and
store the confidence level value in association with the alternative text description, wherein the confidence level value is generated based on scoring each keyword in the alternative text description according to a frequency of occurrence of the keyword in textual description information associated with the one or more similar images and wherein the confidence level value is generated using the following relationship:

$$\text{Confidence level value} = (v/(v+m))*R + (m/(v+m))*C$$

where R is an average score for the keywords in the alternative text description, v is as number of keywords in the alternative text description, m is a minimum number of keywords in the alternative text description required, and C is a mean confidence level value.

9. The computer program product of claim 8, wherein the computer readable program to analyze the original image further causes the computing device to:
classify the image as either informative or non-informative, wherein, in response to the image being classified as non-informative, the computer readable program causes the computing device to abort before executing the performing, extracting, generating, and storing operations.

10. The computer program product of claim 8, wherein the confidence level value is generated based on a comparison of the alternative text description to an existing text description associated with the original image.

11. The computer program product of claim 8, wherein the computer readable program further causes the computing device to:
generate a relevance rating value for the alternative text description, wherein the relevance rating value identifies a level of relevance of the alternative text description to a remaining portion of the electronic document other than the original image; and
store the relevance rating value in association with the alternative text description.

12. The computer program product of claim 11, wherein the computer readable program to generate the relevance rating value further cause the computing device to:
compare at least one of keywords or phrases in the alternative text description to portions of the electronic document;
determine a degree of matching between the keywords or phrases and text in the portions of the electronic document; and
generate the relevance rating value based on the degree of matching, wherein the degree of matching is based on a frequency of occurrence of a matching keyword or phrase in the text of the portions of the electronic document.

13. The computer program product of claim 8, wherein the computer readable program to generate the alternative text description for the original image based on the extracted textual description information associated with the one or more similar images further causes the computing device to, for each similar image in the one or more similar images, collect information regarding at least one of:
a type of source of the similar image;
a textual context in which the similar image is presented in the other documents;
user comments associated with the similar image; or
a frequency of use of the similar image in the other electronic documents, and wherein generating the alternative text description comprises selecting textual description information associated with the one or more similar images based on a weighting of the textual description information of each similar image relative to textual description information of other similar images in the one or more similar images of the collected information, wherein the weighting is based on the collected information.

14. An apparatus, comprising:
a processor; and
a memory coupled to the processor, wherein the memory comprises instructions which, when executed by the processor, cause the processor to:
analyze an original image embedded in an electronic document to generate a data pattern for the image;
perform a matching operation to identify one or more similar images in other electronic documents from one or more sources of electronic documents based on the generated data pattern;
extract textual description information associated with the one or more similar images from data associated with the one or more similar images;
generate an alternative text description for the original image based on the extracted textual description information associated with the one or more similar images;
store the alternative text description for the original image in association with the original image;
generate a confidence level value for the alternative text description, wherein the confidence level value identifies a level of confidence that the alternative text description accurately describes content of the original image; and
store the confidence level value in association with the alternative text description, wherein the confidence level value is generated based on scoring each keyword in the alternative text description according to a frequency of occurrence of the keyword in textual description information associated with the one or more similar images and wherein the confidence level value is generated using the following relationship:

$$\text{Confidence level value} = (v/v+m))*R + (m/(v+m))*C$$

where R is an average score for the keywords in the alternative text description, v is a number of keywords hi the alternative text description, m is a minimum number of keywords in the alternative text description required, and C is a mean confidence level value.

15. The apparatus of claim 14, wherein the instructions to analyze the original image further causes the processor to:
classify the image as either informative or non-informative, wherein, in response to the image being classified as non-informative, the instructions cause the processor to abort before executing the performing, extracting, generating, and storing operations.

16. The apparatus of claim 14, wherein the confidence level value is generated based on a comparison of the alternative text description to an existing text description associated with the original image.

17. The apparatus of claim 14, wherein the instructions further cause the processor to:
- generate a relevance rating value for the alternative text description, wherein the relevance rating value identifies a level of relevance of the alternative text description to a remaining portion of the electronic document other than the original image; and
- store the relevance rating value in association with the alternative text description.

18. The apparatus of claim 17, wherein the instructions to generate the relevance rating value further causes the processor to:
- compare at least one of keywords or phrases in the alternative text description to portions of the electronic document;
- determine a degree of matching between the keywords or phrases and text in the portions of the electronic document; and
- generate the relevance rating value based on the degree of matching, wherein degree of matching is based on a frequency of occurrence of a matching keyword or phrase in the text of the portions of the electronic document.

19. The apparatus of claim 14, wherein the instructions to generate the alternative text description for the original image based on the extracted textual description information associated with the one or more similar images further causes the processor to, for each similar image in the one or more similar images, collect information regarding at least one of:
- a type of source of the similar image;
- a textual context in which the similar image is presented in the other documents;
- user comments associated with the similar image; or
- a frequency of use of the similar image in the other electronic documents, and wherein generating the alternative text description comprises selecting textual description information associated with the one or more similar images based on a weighting of the textual description information of each similar image relative to textual description information of other similar images in the one or more similar images of the collected information, wherein the weighting is based on the collected information.

20. The apparatus of claim 14, wherein the instructions further cause the processor to:
- generate one of an audible or a tactile output of the alternative text description to assist a visually impaired person in obtaining information about the original image.

* * * * *